Patented May 28, 1946

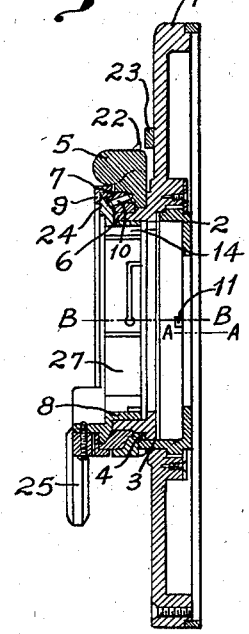

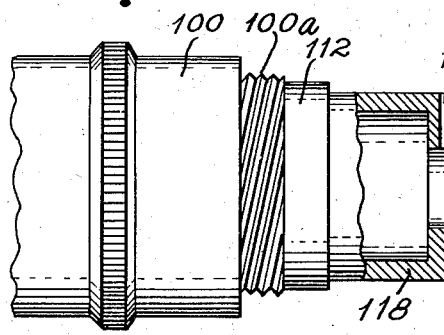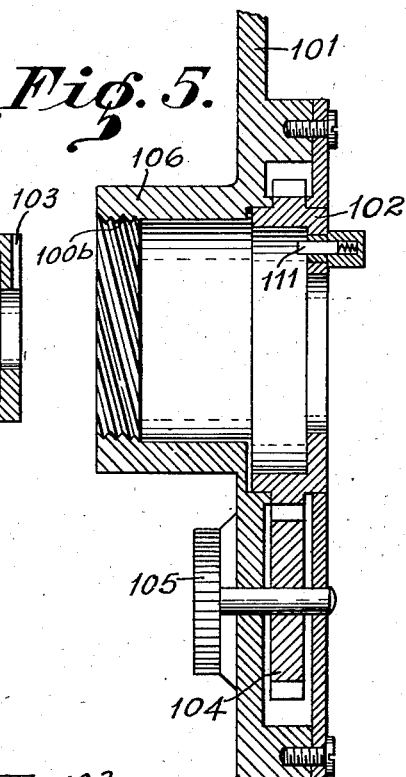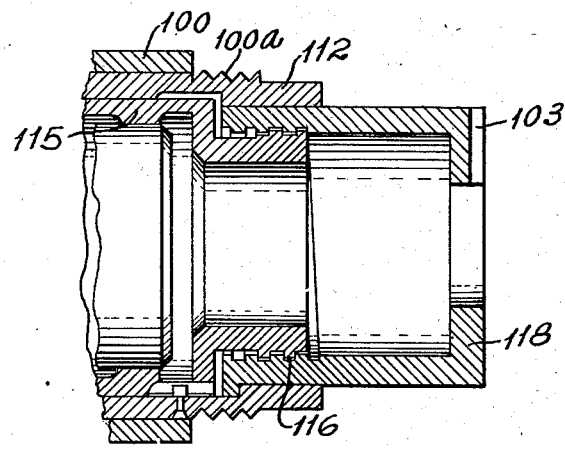

2,401,134

UNITED STATES PATENT OFFICE 2,401,134

DEVICE FOR ADJUSTING OBJECTIVES OF DIFFERENT FOCAL LENGTHS IN CAMERAS

Hermann Bretthauer, Berlin-Lankwitz, Germany; vested in the Alien Property Custodian Application December 27, 1940, Serial No. 371,976
In Germany November 29, 1939

2 Claims. (Cl. 95—45)

The invention relates to a device for adjustment of exchangeable objectives of different focal lengths in cameras, specifically motion picture cameras, in which the objective carrier is axially displaceable in accordance with the amount of turn of an adjusting member.

In order to confine the action of adjustment to the use of one single distance scale when adjusting objectives of different focal lengths, it has for instance been proposed to provide mounts for taking exchangeable objectives in which part of the axial movement of the objectives is carried out by means of an adjusting mechanism provided on the camera, while the remaining part of the axial displacement differing in length according to the respective objectives used is effected by a second adjusting mechanism connected with the objective.

In distinction therefrom the invention provides for the insertion in such a device of a driving mechanism between the member controlling the axial movement of the objective and the adjusting member of the mount, said driving mechanism producing a relative movement between said controlling and said adjusting member. In this connection the controlling member may for instance be supported eccentrically relative to the adjusting member and connected to the adjusting member by a driver sliding in a guiding slot. Contrary to the above mentioned known devices, the device according to the invention is suitable for universal use and affords various advantages as regards construction. Above all the part of the mount for exchanging the objectives which is arranged on the objective itself is considerably simpler of construction and adjustment.

Two embodiments of the invention are represented in the drawings of which

Fig. 1 is a front view of the mount carrier of a motion picture camera,

Fig. 2 a lateral view of a section through the mount carrier according to Fig. 1, Fig. 3 a lateral view of an exchangeable objective in part section, Fig. 4 a front view of a detail of the objective represented in Fig. 3, Fig. 5 a lateral view of a section through a mount carrier of another embodiment on a motion picture camera, Fig. 6 a lateral view of an exchangeable objective in the second embodiment in part section, and Fig. 7 is a longitudinal sectional view through the objective shown in Fig. 6.

Figs. 1 and 2 represent a mount carrier 1 secured on the camera for two coupled mounts. A gear wheel rim 2 is supported in the carrier 1 so as to be rotatable about an axis A—A. A lug 3 of the gear wheel rim 2 projects through the wall of the carrier 1. This lug slides in a radial slot 4 of an adjustable ring 5 rotating about the axis B—B. The adjusting ring 5 is supported on a sleeve 6 of the mount carrier 1. A set ring 7 is secured on the sleeve in front of the adjusting ring 5. A bayonet-joint ring 8 is turnable on the inner side of the sleeve 6 having a flange 24 held by a covering ring 9. A handle 25 is arranged on the bayonet ring 8. A pin 10 is disposed in a bore of the set ring 7 which engages a recess in the adjusting ring 5 when infinite adjustment is called for. The flange 24 of the bayonet ring 8 possesses a corresponding recess (not shown) arranged in such manner that the pin cannot escape into this recess except in the closed position of the bayonet ring 8. Hence the adjusting ring 5 is locked by means of the pin 10 as soon as the bayonet ring 8 is released from its locked position. On the other hand the bayonet ring 8 due to the locking by the pin 10 can only be moved when the position of the adjusting ring 5 corresponds to the infinite position.

A driver pin 11 is provided on the gear wheel rim 2. The latter at a rotation of the adjusting ring 5 is caused to follow by the lug 3. As the gear wheel rim 2 is supported eccentrically relative to the adjusting ring 5, the lug 3 can slide in the radial groove 4. The gear wheel rim 2 engages in a gear wheel rim 26 serving to adjust a finder objective not shown.

The objective mount shown in Figs. 3 and 4 is inserted in the mount carrier 1 in such manner that the bayonet sets 13, 30 provided on the outer tube 12 project through slots 14, 27, 28 in the bayonet ring 8 and are capable of being locked through a turn of the bayonet ring. An objective tube 15 is axially displaceable but non-rotatable in the mounting tube 12. A worm threaded tube 16 is supported rotatably but not axially displaceable in the mounting tube 12 and engages in the thread of the objective tube 15, so that the latter (15) is axially displaced by an amount corresponding to the thread ascent covered. The worm threaded tube 16 is connected with a flange-like control ring 18 by means of grub screws 17, said control ring 18 possessing a guiding groove 29. A catch 19 is mounted in the control ring 18, which, when the control ring 18 is set for infinite rotation, urged by the leaf spring 20 engages a slot 21 of the mounting tube 12. Thus, when the mount is removed from the mount carrier, the control ring 18 is locked for infinite movement by means of the catch 19. Upon insertion of the mount, the catch 19 is automatically removed from the slot 21 and thus the control ring 18 is released. The driver pin 11 of the gear wheel rim 2 thereby engages in the guiding groove 29 of the control ring 18. Through the locking of the control ring 18 on the one hand and of the adjusting ring 5 on the other hand, the guiding groove 29 and the driver pin 11 are brought into corresponding positions, when the mount is inserted. As will be readily apparent, the control ring 18 and the gear wheel rim 2 are eccentric relative to one another. Now if the gear wheel rim 2 is turned by means of the adjusting ring 5, the pin 11 of the control ring is caused to follow, whereby however the control ring through the driver 11 sliding in the guiding groove 29 makes a movement relative to the gear wheel rim 2 which is determined by the position and the course of the guiding groove 29 and by the amount of eccentricity. It is practically always possible by means of suitable dimensioning of the worm acclivity and of the eccentricity to render the course of the guiding groove uncomplicated, i. e. either circular, as in the embodiment, or rectilinear and consequently easy of manufacture. By displacing the control ring 18 relative to the worm threaded tube 16 it is possible to adjust the objective tube accurately for infinite turning.

An adjusting scale 23 cooperating with a pointer 22 of the adjusting ring 5 is calibrated in accordance with the finder objective controlled by the gear wheel rim 26. The finder objective might of course be controlled in the usual simple manner by means of a worm threaded mount. In the embodiment, however, the gear wheel rim 26 is likewise eccentric relative to the control ring of the worm threaded mount and coupled with same by means of a driver pin 31 sliding in a guiding groove. This construction has the advantage that the deviations from the desired focal length even in the finder objective may be taken into account by suitable development of the guiding groove. A further possibility of adaptation consists in choosing a different eccentricity for the finder objective than that of the main objective. By giving the two gear wheel rims 2, 26 a different number of teeth, an additional means exists of changing and compensating for the transmission between focussing and adjustment. It is immaterial as regards the inventive principle whether merely one single objective or a pair of coupled objectives or even, for instance in a revolver arrangement, several coupled objectives are adjusted, in the case of the latter according to a common distance scale or to the ascertained clearness of image revealed by one of the coupled objectives.

In the second embodiment represented in Figs. 5, 6 and 7 the mount 100 is capable of being screwed by means of coarse pitch threads 100a and 100b in less than a completed revolution into a sleeve 106 of a mount carrier 101. A gear wheel rim 102 with a driver pin 111 is turnable by means of an adjusting knob 105 via a gear wheel 104. The driver pin 111 is axially resilient. The mount 100 in its construction substantially corresponds to that described above with the exception that no locking arrangement is provided for the control ring 118 relative to the objective tube 112. In other words, the objective mount 115 is axially movable relative to objective tube 112, whereas control ring 118 is rotatable relative to the objective tube, said relative rotation being produced by the worm thread connection 116. When the mount 100 is being screwed in, the resilient driver pin 111 is in the first instance depressed, and in the course of the screwing-in movement, snaps into the guiding groove 103 of the control ring 118. Hence upon continuation of the screwing movement, the control ring 118 is retained by the driver 111 and the objective tube displaced axially so that upon termination of the screwing movement the objective is automatically adjusted for the distance corresponding to the position of the driver pin 111 and the gear wheel rim 102, respectively. In this embodiment, therefore, the objective may be exchanged at any adjustment and the new objective is automatically adjusted for the same sharpness as was the objective previously removed. In addition the locking arrangements for the mount and the adjustment may be dispensed with.

What I claim is:

1. Device for the adjustment on cameras of exchangeable objectives of different focal lengths comprising in combination, a mount carrier secured on the camera and serving to take the respective objective mounting tubes, said mount carrier having a rotatable first ring element and a second rotatable ring element as well as means for causing the follow-up movement of the second ring element on turning the first ring element, said two ring elements being eccentrically supported relative to one another, an objective carrier axially displaceable in the objective mount tube, means for axially displacing the objective carrier in accordance with the turn of the second ring element, said means for displacing said second objective carrier consisting of a second, inner tube provided with a worm thread seated in the objective mount tube and cooperating with the objective carrier and a control ring secured on the worm threaded tube and cooperating with the second ring element by means of an oblique guide provided on said control ring, said oblique guide consisting of a guiding slot in the control ring and a driver pin secured on the second ring element and sliding in the guiding slot.

2. Device for the adjustment on cameras of exchangeable objectives of different focal lengths, comprising in combination, a mount carrier secured on the camera and serving to take the respective objective mounting tubes by means of a bayonet joint, said mount carrier having a rotatable first ring element and a second rotatable ring element as well as means for causing the follow-up movement of the second ring element on turning the first ring element, said two ring elements being eccentrically supported relative to one another, an objective carrier axially displaceable in the objective mount tube, means for axially displacing the objective carrier in accordance with the turn of the second ring element, said means for displacing said second objective carrier consisting of a second, inner tube provided with a worm thread seated in the objective mount tube and cooperating with the objective carrier and a control ring secured on the worm threaded tube and cooperating with the second ring element by means of an oblique guide provided on said control ring, said oblique guide consisting of a guiding slot in the control ring and a driver pin secured on the second ring element and sliding in the guiding slot, said control ring being rotatable relative to the worm threaded tube with a view to adjustment and restrainable at the worm threaded tube.

HERMANN BRETTHAUER.